(12) United States Patent
Hartge

(10) Patent No.: US 8,017,066 B2
(45) Date of Patent: Sep. 13, 2011

(54) METHOD AND APPARATUS FOR FORMING MELT SPUN NONWOVEN WEBS

(76) Inventor: Perry Hartge, Allison Park, PA (US)

(*) Notice: Subject to any disclaimer, the term of this patent is extended or adjusted under 35 U.S.C. 154(b) by 666 days.

(21) Appl. No.: 11/520,045

(22) Filed: Sep. 13, 2006

(65) Prior Publication Data

US 2007/0057414 A1    Mar. 15, 2007

Related U.S. Application Data

(60) Provisional application No. 60/596,311, filed on Sep. 14, 2005.

(51) Int. Cl.
 *B28B 5/02* (2006.01)
(52) U.S. Cl. ............... 264/555; 264/172.19; 425/72.2; 425/83.1
(58) Field of Classification Search ............ 264/172.9, 264/555; 425/72.2, 83.1
See application file for complete search history.

(56) References Cited

U.S. PATENT DOCUMENTS

| | | | |
|---|---|---|---|
| 3,707,593 A * | 12/1972 | Fukada et al. | ............ 264/555 |
| 3,802,817 A | 4/1974 | Matsuki et al. | |
| 4,405,297 A * | 9/1983 | Appel et al. | ............ 425/72.2 |
| 5,032,329 A | 7/1991 | Reifenhauser | |
| 5,503,784 A | 4/1996 | Balk | |
| 5,814,349 A | 9/1998 | Geus et al. | |
| 6,183,684 B1 | 2/2001 | Lu | |
| 6,607,624 B2 * | 8/2003 | Berrigan et al. | ............ 156/167 |
| 6,692,601 B2 | 2/2004 | Najour et al. | |
| 6,783,722 B2 | 8/2004 | Taylor | |

* cited by examiner

*Primary Examiner* — Yogendra N Gupta
*Assistant Examiner* — Alison Hindenlang
(74) *Attorney, Agent, or Firm* — Edell, Shapiro & Finnan, LLC

(57) ABSTRACT

A method and apparatus for forming nonwoven melt spun webs by spinning a curtain of filaments into a pressurized chamber where they are contacted with pressurized quenching fluid, then using the fluid to draw the filaments through a slot at the bottom of the chamber. The slot is a narrow two dimensional impingement point running the length of the filament curtain where the pressurized quench fluid passes through, escaping to atmosphere. The fluid pressure (potential) energy in the chamber is exchanged for velocity (kinetic) energy at the slot impingement point. The fast moving stream of fluid inside and exiting the slot acts to pull, or draw the filaments through the slot. The fluid and fiber stream is deposited onto a porous collection conveyor belt, forming a fleece web. The invention is more efficient, less complicated, easier to maintain and easier to control than prior systems for melt spinning nonwoven webs.

26 Claims, 2 Drawing Sheets

METHOD AND APPARATUS FOR FORMING MELT SPUN NONWOVEN WEBS

CROSS REFERENCE TO RELATED APPLICATION

This application claims priority from U.S. Provisional Patent Application Ser. No. 60/596,311, filed Sep. 14, 2005 and entitled "Method and Apparatus For Forming A melt Spun Nonwoven Web". The disclosure of this provisional patent application is incorporated herein by reference in its entirety.

FIELD OF THE INVENTION

The present invention pertains to methods and apparatus for spinning thermoplastic polymer filaments and, more particularly, to improvements therein using non-eductive drawing.

BACKGROUND

In general, spun bond nonwoven production machines can be classified as eductive "open" spinning systems and non-eductive "closed" spinning systems. Conventional broad loom eductive systems can generally trace their roots to the subject matter disclosed in U.S. Pat. No. 3,802,817 (Matsuki et al.) which describes a system that extrudes a curtain of filaments, extending the full width of the machine into, atmosphere (and/or impinged with cooled air). The curtain is then subjected to the action of a pair of air jet streams in a sucker, or filament drawing unit, the jet velocity of said jet streams being selected in the turbulent range. The jets act to entrain air from atmosphere along with the fibers which are then projected from the drawing unit onto a gas pervious conveyor belt collector to form a web. The quenching air system is separate from the filament drawing unit system. The fibers being spun are typically exposed to atmosphere at least once and usually twice: once just after being extruded and then again between the drawing device and the collector belt. This basic design has evolved into modern systems, for example, see U.S. Pat. Nos. 6,183,684 (Lu), 6,783,722 (Taylor) and 6,692,601 (Najour), all of which describe improved non-eductive "open" spinning nonwoven production systems.

Conventional broad loom non-eductive spinning systems can generally trace their roots to the disclosure in U.S. Pat. No. 4,405,297 (Appel et al.) which describes a system for forming spun bond nonwoven webs by spinning a plurality of filaments into a quench chamber where they are contacted with a quenching fluid, then utilizing the quench fluid to draw the filaments through a nozzle spanning the full machine width, and collecting the filaments as a web on a gas pervious conveyor belt collector. The fibers being spun are usually enclosed or shielded from atmosphere until they are formed into a web on a conveyor. This basic design has evolved into modern systems, for example U.S. Pat. No. 5,032,329 (Reifenhauser).

There are also hybrids of the two arts in which closed systems are aided by high pressure eductive jets to increase filament speeds, as shown in U.S. Pat. Nos. 5,503,784 (Balk) and 5,814,349 (Geus et al.).

The systems and methods discussed above have various disadvantages and limitations. Specifically, eductive (open) type systems inherently create high levels of turbulence and vorticity that are hard to control from day to day, and which tend to entangle and group the filaments into bundles, thereby limiting the uniformity of the final products. Furthermore, prior art eductive systems involve small fixed eductor throat openings which suffer drawbacks such as frequent plugging and cannot be opened to clear drips and plugs. In addition to plugging the throat of an eductor, small deposits of polymer drippings, monomer build up and scratches from constant cleaning all affect the patterns of turbulence on a day to day, and even on an hour to hour basis. The high speed jet nozzles themselves tend to become clogged by debris that enter from the process air supply and monomer, thereby drastically upsetting flow in the highest speed areas and creating vortices in the drawing unit. These systems also require two sources of air and two sets of associated equipment; one, a low pressure cooled air source that is used to quench the molten filaments by removing heat energy; and the other, a high pressure air source required to produce high velocity air to draw the filaments. The high velocity air generates high noise levels as it draws the filaments. While higher spin speeds required for spinning polyester and Nylon can be achieved with specialized eductive systems, the problems of turbulence and system hygiene are amplified by higher air jet pressures and velocities. Thus, forming a uniform web is very difficult with these systems because the fiber/air stream is moving very fast relative to the vertically stationary (but horizontally moving) collector belt. The amount of energy in the stream is so high at the belt that the fibers tend to bounce off the belt. The fibers can also be blown off the belt by the excess of air that cannot be passed through the below-the-belt vacuum system that generally is not able to evacuate all of the process air.

Conventional non-eductive (closed) systems typically permit somewhat more web formation control than do eductive systems; however, the non-eductive systems have fiber spin speed limitations. The long nozzle or throat sections where the fibers are attenuated are subjected to large structural loads from pressurized quench fluid. Even at pressures slightly above atmosphere, these walls must sustain loads of thousands of kilograms. These pressure loads cause deflection of the walls which, in turn, have to be pushed back into place uniformly across the machine width. The geometry of the nozzle controls quench fluid speed, which in turn controls fiber speed and formation of the web. Structural support of the wall geometry severely limits the pressure of the quench fluid, ergo the permissible velocity of the fluid in the nozzle and fiber speed. Also, the large surface areas of the nozzle have the same system hygiene problems as are present in eductive systems, but there is more surface area for deposits to collect, and it is not easy to get inside these nozzles to effect cleaning.

Hybrid systems were conceived primarily to increase the spin speeds of non-eductive systems. Hybrids typically incorporate eductive air jets somewhere along the nozzle area, which act to boost nozzle velocity without increasing quench fluid pressure. These systems have worked for some but not all higher speed spinning applications, and tend to be very complicated and capital intensive, and require substantial operation and maintenance attention.

SUMMARY OF THE INVENTION

In contrast to the prior art systems described above, the system and method of the present invention involve an initial quench chamber and the use of a continuous two-dimensional slot across the entire machine width which produces a linear plane of filaments in the slot impingement point section. The linear plane of filaments has substantially constant filament distribution across the machine width, and provides for good control of cross-machine uniformity. As used throughout this description, "machine widths" refers to a dimension corresponding to the width generally of the spinning plate and is perpendicular to the collector belt travel. It is preferred that the width correspond to the desired end web width. The width of the machine is only limited by the ability to machine and maintain close geometric tolerance of the impingement slot dimensions. The process equipment is very simple compared to both eductive and non-eductive systems.

No air is educted into this system as the quench fluid, usually air, undergoes uniform acceleration into the impingement slot where the drawing force is developed. The same air is used for two purposes: first to quench the filaments and then to draw them as the air exits through the drawing impingement slot at high velocity. The drawing chamber is relatively small and there is substantially no nozzle length parallel to the fiber/air stream; therefore higher quench pressures can be obtained without leading to structural deflection problems that affect spinning area geometric tolerances which in turn would cause variations in spin velocities and turbulence. Higher pressures and the mixing effect of the exiting fiber/quench stream produce very high air and fiber velocities. The small amount of close tolerance machined surface area that is exposed to the fiber stream (i.e., only the tips of the air knives) collect far less dirt, polymer drippings and monomer build up than other systems. Cleaning is much simpler and only takes a few seconds while the machine is running by opening the slot for a few seconds and wiping clean the knife edges. An automatic wiper could be employed. This can be done several times a day, if needed, whereas most other conventional systems require hours and even days to clean educator and nozzle surfaces.

By selecting a suitable slot gap opening, the necessary drawing tension can be obtained. Filament cooling is controlled by regulating the temperature of the quench fluid and controlling the rate of flow of air past the filaments to exhaust ports near the top of the quench chamber, as is known in the prior art. The amount of quench air exiting the duct is important to the operation of the process, so this flow rate is preferably closely monitored and controlled. If there is too high an exhaust flow, the velocity of the air through the filament bundle will cause the filaments to waver and stick to each other, thereby causing filament breakage. The filaments will also be cooled too rapidly and large denier, brittle filaments will be produced. With too little exhaust, the filaments may not be totally quenched when they enter the drawing impingement slot, increasing the incidence of sticking to the slot's air knives.

To achieve the benefits of the present invention, it is desirable that the apparatus be constructed and the method carried out within certain ranges of parameters. For example, the quench air should be maintained at a temperature in the range of from about 40° F. to 200° F. The air flow rate should be maintained within the range of from 850 cubic meters per hour to 3,400 cubic meters per hour per meter of machine width, and the slot opening should have a length from about 0.5 mm to 10 mm. As indicated above, the exhaust flow rate is important in achieving the desired filament properties and, generally, will be within the range of from nearly 0 to about 400 cubic meters per hour per meter of machine width.

The length of the quench chamber for a particular application will depend, of course, upon the material being spun and the particular web properties desired. Accordingly, these parameters may vary widely, but, in general, will be at least 250 mm and, preferably within the range of from about 250 mm to 1500 mm for the length of the quench zone from the spinneret to the impingement slot. Similarly, the spinneret capillaries may be in many configurations but will, generally, be employed in the range of from about 500 to 8000 holes per meter of machine width in a uniform capillary array. As will be apparent from the foregoing description, the method and apparatus of the present invention are extremely flexible and can be varied to accommodate a wide variety of materials and operating conditions. That constitutes a particular advantage and feature of the present invention.

The above and still further features and advantages of the present invention will become apparent upon consideration of the following definitions, descriptions and descriptive figures of specific embodiments thereof wherein like reference numerals in the various figures are utilized to designate like components. While these descriptions entail specific details of the invention, it should be understood that variations may and do exist and would be apparent to those skilled in the art based on the descriptions herein.

DESCRIPTION OF THE PREFERRED EMBODIMENTS

Figure 1:
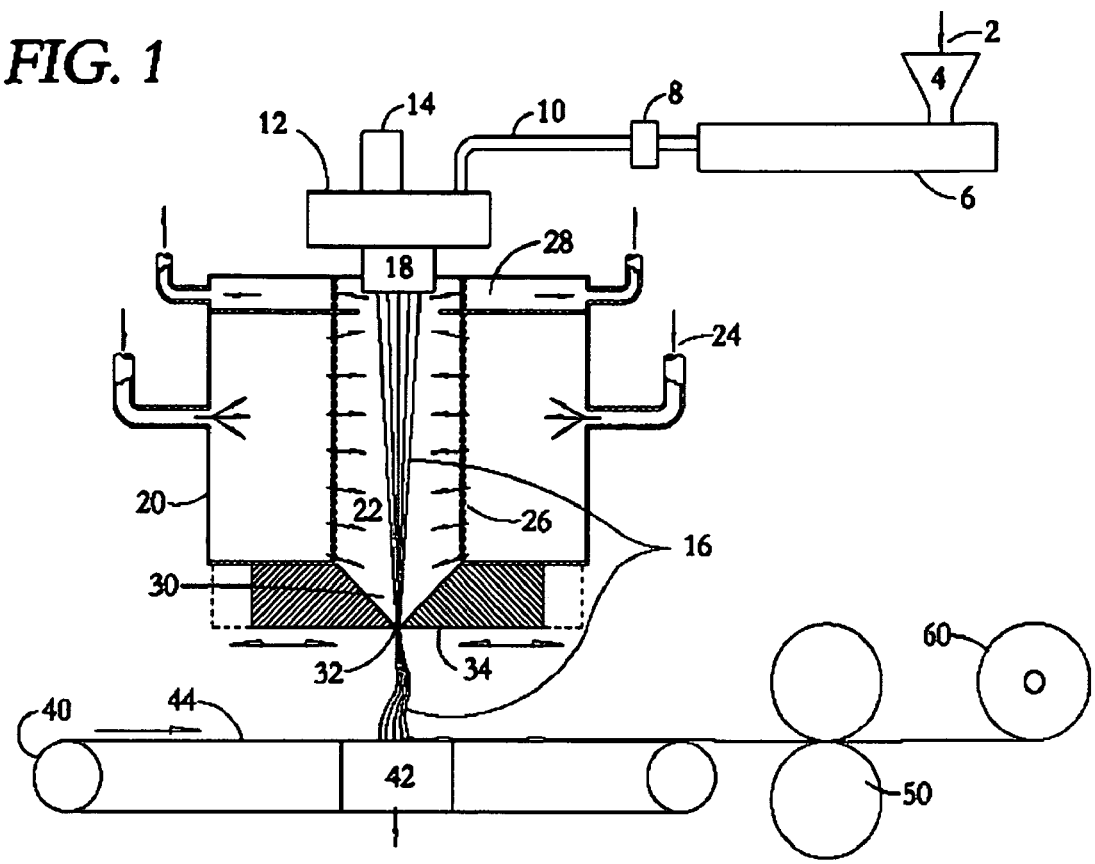
FIG. 1 is a schematic flow diagram of a preferred embodiment of the present invention shown operating in a "run" mode.
Figure 2:
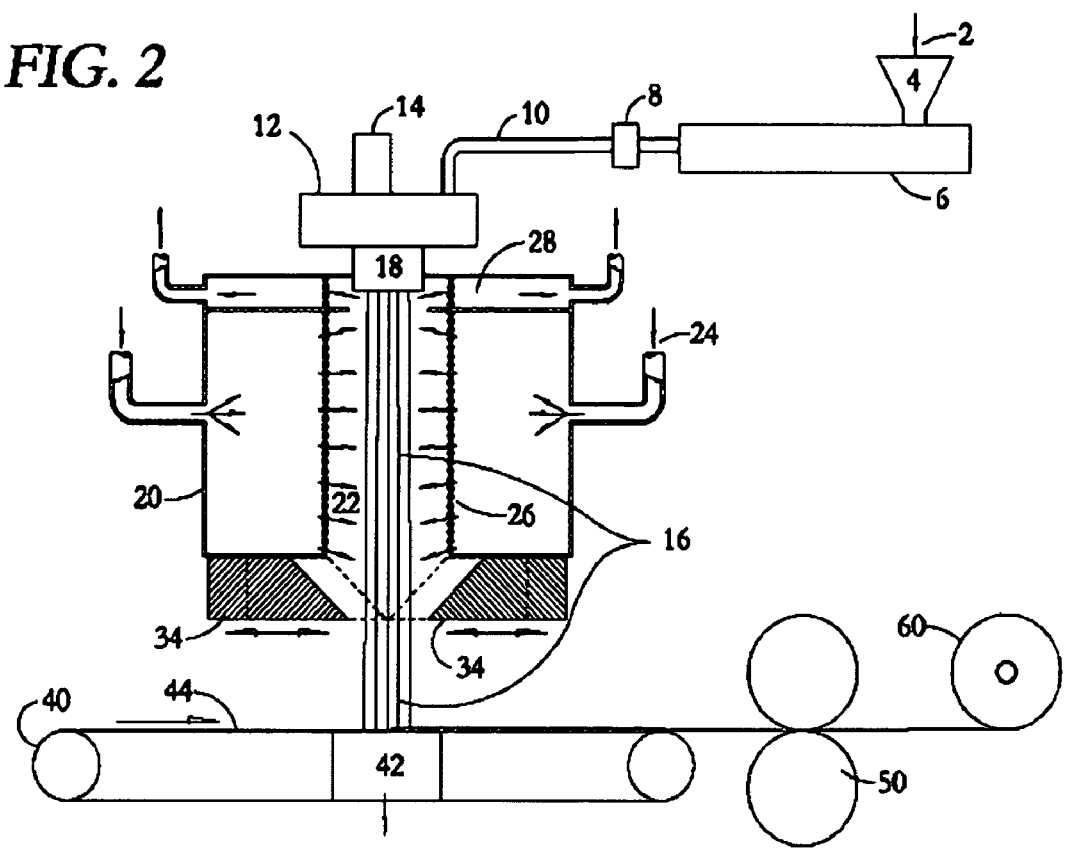
FIG. 2 is a schematic flow diagram of the preferred embodiment of FIG. 1 shown operating in a "run" mode.

The following detailed explanations of FIGS. 1 and 2 of the preferred embodiments reveal the methods and apparatus of the present invention. The architecture depicted in the drawings is a conceptual diagram illustrating major functional units, and does not necessarily illustrate physical relationships.

The present invention harnesses the positive aspects of both eductive and non-eductive (and hybrid) systems into a more efficient and simpler design. More importantly, the invention solves many of the problems associated with conventional nonwoven spun bond systems including: spinning speed limitations, energy consumption, machine element cleanliness (i.e., hygiene), web uniformity, capital costs and process control. The invention also incorporates aspects of another, different type of nonwoven web forming technology, the meltblown process, as shown in U.S. Pat. No. 3,825,380 (Harding et al.) to help improve web formation control.

While the invention is described in connection with preferred embodiments, it will be understood that it is not intended to limit the invention to those embodiments. On the contrary, it is intended to cover all alternatives, modifications and equivalents as may be included within the spirit and scope of the invention as defined by the appended claims.

Referring to FIG. 1, the first step in the method of the invention is to provide a thermoplastic polymer in fluid condition for spinning. The flexibility of the system and method of the present invention allows a wide variety of polymers to be processed. For example, any of the following may be employed: polyamides, polyesters, polyolefins, polyvinyl acetate, polyvinyl chloride, polyvinyl alcohol, and the like. It is, of course, contemplated to also utilize other spinable materials which may not be ordinarily considered polymers such as, for example, molten glass and carbon fiber pre-cursors. It is important that the material be capable of being made sufficiently fluid for spinning and otherwise have the properties necessary to undergo drawing in the filament drawing zone. Other examples will become apparent to those skilled in the polymer art.

The molten polymer or other raw material is fed from supply 2 to hopper 4, then through screw extruder 6, filter 8, and polymer transfer pipe 10 to spin box 12, which contains one or more metering pumps 14. Filaments 16 are spun through spinneret 18 with appropriate openings arranged in one or more rows forming a curtain of filaments 16 directed into the quench chamber 20. In the quench chamber 20 the filaments 16 are contacted with air or other cooling fluid 22 received through fluid inlet 24 and diffused through perforated apertured plates 26. The quench fluid, usually air, is maintained cooler than the filaments, preferably near ambient temperature, but anywhere, for example, in the range of from about 40° F. to 200° F. The quenching fluid is supplied under pressure of less than 4 bar, preferably less than 2 bar, and a portion is preferably directed through the filament curtain 16 and removed as exhaust through ports 28.

As described above, the proportion of the air supplied that is discharged as exhaust will depend on the polymer being used and the rapidity of quenching needed to give desired filament characteristics such as denier, tenacity and the like, and to exhaust by-products of extrusion i.e.: smoke and monomer.

As quenching is completed, the filament curtain is directed through a narrowing lower end 30 of the quenching chamber into the impingement point slot opening 32 where the quench air attains a velocity that can be anywhere in the approximate range of 3,000 to 21,000 meters per minute. The drawing slot extends across the full machine width and is preferably formed by two identical air knives 34 having an angle in the range from about 15° degrees to 80°, with a preferred angle of 45°, spanning the width of the machine. In the preferred embodiment the bottom surfaces of the knives 34 are coplanar and substantially horizontal; however, it is to be understood that these surfaces can be angled to converge toward one another for certain applications. The convergence, if provided, would typically be such as to provide a protruding or convex bottom surface for the chamber, although in some instances a recessed or concave bottom surface may be provided. The movable air knives can be retracted from one another under the chamber assembly using a manually actuable and lockable slide arrangement, or a hydraulically or otherwise actuable arrangement. FIGS. 1 and 2 depict knives forming a 90° entry angle between them. The blades may either slide laterally or instead pivot about a point near the upper corner of the blade, whereby the tip of each blade would swing down in an arc until the upper blade surfaces came into a parallel relationship for cleaning. To pass slubs, the tips would only need to move ½" or so apart.

Referring to FIG. 2, during start-up, the knives are fully retracted or spaced from one another so that the filaments can fall by gravity through the wide open slot. The low velocity of the incoming quench air is maintained through the wide open slot so that little aerodynamic drawing actually occurs. When polymer flow is fully established, the air knives are slowly moved toward one another to decrease the slot opening, increase the air velocity, and draw the filaments. If a major process upset occurs and the drawing slot becomes partially plugged or clogged with polymer during operation, one or both air knives can be momentarily drawn back until the polymer plug falls through the enlarged nozzle opening. The air knives 34 can then be moved back to their normal operating position.

The position of the air knives relative to each other determines the size of the drawing nozzle opening and thus the velocity of the air going through the nozzle for a given quench air flow rate, pressure and exhaust setting. The filament drawing force increases as the air velocity increases so that the filament denier can be easily changed by simply increasing or decreasing the size of the nozzle opening. Filament denier can also be increased several other ways i.e.: enlarging the slot gap; reducing the air flow rate through the slot by decreasing the pressure in the chamber; increasing the exhaust air flow rate; lowering the quench air temperature; decreasing the polymer temperature; increasing the polymer viscosity; or increasing the polymer throughput per capillary.

Thus, the filament deniers can be changed relatively easily and rapidly in several different ways which do not affect the distribution of filaments exiting the slot to atmosphere. In all cases, the slot desirably spans the entire width of the machine. Therefore, a distribution of filaments corresponding substantially identically to the distribution of the orifices in the spin plate across the machine width is maintained all the way to the outlet of the slot. When the fibers and quench fluid exit the impingement slot 32, they are exiting to atmosphere. Exposing the filaments to the interior of a high speed air stream, similar in speed to an eductive fiber draw unit jet stream, produces very good energy transfer from quench fluid velocity to fiber speed, for several reasons:

- The air jet formed at the impingement point is transferring energy only to fibers (like a non eductive system) and not wasting energy entraining air from atmosphere to create the low pressure suction at the top of an eductive drawing device.
- The fibers are exposed to the air jet formed inside the impingement point, which means that the fibers see the peak velocity of the stream. In eductive systems, the fibers enter the stream (in the fiber draw unit) after the jet achieves peak velocity, after it mixes with atmosphere and entrained air, so that that the resultant energy transfer, directly to the fibers, is lower.
- When a stream of fluid is directed through an air knife slot to atmosphere, it immediately loses its pressure as it expands to atmosphere. Energy of the quench fluid mass is transformed from pressure to velocity. The stream begins to "opens up" or widen from the original slot width as the pressurized compressible gas expands, which, in turn, begins to slow the stream velocity. If one adds fibers at this point, the mix of expanding fluid and independent flexible fibers creates a highly turbulent mixing zone just below the exit which tremendously aids the transferring of quench fluid energy (mass×velocity) to fiber velocity. This also acts to slow down the stream. More specifically, within the first few inches after leaving the slot opening of the pressurized quench chamber, the stream of fibers and quench fluid is rapidly slowed as velocity energy of the quench fluid is transferred to the fibers and the fiber air stream entrains air from atmosphere, resulting in velocities of quench fluid and fibers that are much closer matched than conventional eduction open spinning systems. The fibers have a chance to slow down to a speed lower than their peak spinning speed which causes them to collapse on themselves and interweave and entangle before they reach the conveyor belt, resulting in improved web formation uniformity and isotropicity.

The distance from the spinneret to the impingement point is comparatively short; thus, the effects of friction between the spinning fibers' velocity and the quench fluid do not create much friction resistance on the fiber bundle compared to conventional systems with long quench and spin line distances. The higher density (compared to atmosphere) acts to remove heat energy faster, but can also lead to higher friction losses. Hence the spin line can be shorter than conventional systems The dynamic nature of this fiber and quench fluid "stream" after it exits the slot impingement point is similar in nature to the fiber and air stream in meltblown processes. Therefore, those skilled in the art of forming meltblown nonwoven webs can control the laydown process in a similar manner. An additional advantage of this system is that the velocity energy of the system expands and dissipates very quickly, which means that the lay down speed of the fibers when they land on the conveyor collector are significantly slower than in conventional systems, which is much easier to control and leads to better web uniformity. As the fiber bundle slows down before hitting the belt, the fibers bunch up and fold over on each other, leading to better fiber distribution, which makes a more isotropic web in terms of strength and elongation and visual uniformity of basis weight distribution.

Referring again to FIG. 1, a very important element of the invention involves the web forming table 40 positioned below the slot 32 of the quench chamber 20 to receive filaments 16 and form the filaments into a non-woven web. The web forming table 40 comprises a vacuum suction box 42 for pulling down filaments onto a moving mesh wire belt conveyor 44 which transports the as-formed web to the next stage of the process for strengthening the web by conventional techniques to produce the final non-woven fabric web. For example, one possible bonding method could be calendering, 50. After bonding, the nonwoven fabric can be wound into rolls 60 for ease of shipping to final end user.

The specific test results listed in the Table below are illustrative of the operation of the present invention. The tests were carried out on apparatus of the type illustrated in FIGS. 1 and 2 having parameters indicated in the Table, a quench zone length of 24 inches from spinneret face to slot opening, slot gap openings as indicated in the Table, and a capillary throughput as indicated in the Table. The polymer spun was 35 MFI polypropylene with a melt temperature of about 235° C. The incoming angle of the combined air knives forming the slot opening was 90°, with an outgoing angle of 180°.

In summary, the foregoing specific examples illustrate the present invention and its operation highlighting spinning advantages. Preferred embodiments include the formation of low basis weight webs from fine polypropylene filaments of under 5 denier and production rates over 200 kg per hour per meter of beam width; point bonding these webs to produce a nonwoven material useful for many applications including (1) liners for sanitary products, (2) limited use garments, (3) surgical drapes and even (4) durable goods.

Another embodiment would include the formation of webs from fine or coarse filaments of polyester under 15 denier and production rates over 200 kg per hour per meter of beam width; point bonding or area bonding these webs to produce a nonwoven material useful for (1) industrial filtration, (2) automotive carpet, (3) roofing applications, (4) commercial dryer sheets (5) hygiene products.

The method and apparatus of the present invention are useful to make fine continuous filaments even if they are not formed into a spunbond web. For example, the spun fibers can be collected and used as pillow and cushion stuffing. For this purpose the fibers can be feed directly into the pillow or cushion casing from the slot opening of the quench chamber. Alternatively, the fibers can be baled and sold.

Thus it is apparent that there has been provided, in accordance with the invention, an improved method and apparatus for forming fine continuous filaments having particular utility in forming nonwoven webs in a manner that that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Having described preferred embodiments of a new and improved method and apparatus for forming fine continuous filaments in general and melt spun nonwoven webs in particular, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

TABLE

| Run # | Quench air temp F. | Air Press. psig | gm/hole/min | slot gap, in. | Fume Exh Diam. | Low Denier | High Denier | Avg. Denier | Spin Well? | pack press, psi | spin speed m/min |
|---|---|---|---|---|---|---|---|---|---|---|---|
| 23 | 44 | 7.5 | 1 | 0.067 | 3/16" | 2.2 | 3.8 | 3.00 | stable | 1580 | 3,000 |
| 24 | 45 | 10 | 1 | 0.067 | 3/16" | 2.5 | 4.2 | 3.35 | stable | 1600 | 2,687 |
| 25 | 48 | 12 | 1 | 0.067 | 3/16" | 2.2 | 2.8 | 2.50 | stable | 1620 | 3,600 |
| 26 | 50 | 12 | 1.21 | 0.067 | none | 2.5 | 3.4 | 2.95 | stable | 1810 | 3,692 |
| 27 | 52 | 12.5 | 1.5 | 0.067 | none | 2.8 | 4.2 | 3.50 | stable | 2040 | 3,857 |
| 28 | 51 | 12.5 | 0.83 | 0.067 | none | 1.7 | 2.5 | 2.10 | stable | 1580 | 3,557 |
| 29 | 54 | 12.5 | 0.55 | 0.067 | none | 0.5 | 2.2 | 1.35 | stable | 1320 | 3,667 |
| 30 | 43 | 15 | 0.55 | 0.05 | none | 1.2 | 2.5 | 1.85 | stable | 1360 | 2,676 |
| 31 | 43 | 15 | 1 | 0.05 | none | 2.8 | 4.2 | 3.50 | stable | 1800 | 2,571 |

Conditions common to all runs:
35 MFI polypropylene
polymer temperature 230° to 240° C.
spinneret with 27 round spinning orifices in a 2" diameter pattern
spinning distance from spinneret face to slot knife edges = 24"
slot entrance vee = 90 degrees and exit flat

What is claimed is:

1. A method for forming a spun bond nonwoven web from extruded polymer filaments in a machine having a machine width, comprising the steps of:
   (a) extruding a plurality of continuous thermoplastic polymeric filaments through a spinneret;
   (b) non-eductively drawing and cooling a curtain of said filaments in a pressurized quench chamber having an ingress opening at the top of the machine extending substantially across the machine width, said curtain of filaments having a substantially constant filament distribution across the machine width, said step of non-eductively drawing and cooling including dimensioning and configuring the quench chamber to avoid substantial contact between said filaments and interior surfaces of the quench chamber, and providing a quench chamber volume sufficient to allow solidification of said filaments within said quench chamber;

(c) supplying the pressurized quench chamber with compressed quench fluid at a temperature lower than the temperature of the filaments in the quench chamber and at a pressure in a range from about 0.1 to 4 bar;

(d) introducing said quench fluid on at least one side of said curtain of filaments and directing said fluid into contact with said curtain of filaments in said quench chamber to cause cooling of the filaments;

(e) creating a turbulent mix of fibers and quench fluid in an impingement zone located adjacent the bottom of said quench chamber with sufficient turbulence to produce efficient energy transfer from quench fluid velocity to fiber velocity;

(f) increasing the turbulence of said mix in said impingement zone by providing lower surfaces of the chamber tapering toward each other in the direction of filament flow through the chamber and terminating at facing edges of respective knife structures at said impingement zone;

(g) flowing the turbulent mix of fibers and quench fluid as a stream to a lower pressure environment through a drawing slot in the form of a chamber exit nozzle defined by and between the facing edges of said knife structures and extending substantially across the machine width at the bottom of said chamber and at the impingement zone such that the drawing slot has no substantial nozzle length in the direction of flow through the nozzle to thereby minimize collection of dirt and polymer and monomer in the exit nozzle, whereby, within the first few inches after passing through the drawing slot the turbulent mix stream is rapidly slowed as velocity energy of the quench fluid is transferred to the fibers and the stream entrains air from the lower pressure environment and expands; and (h) collecting the slowed filaments for formation into a non-woven fabric sheet on a web forming conveyor.

2. The method of claim 1 wherein increasing the turbulence of said mix in step (f) includes providing said lower surfaces such that each knife structure is defined between two surfaces having an angle between them in the range from about 15° degrees to 80°.

3. The method of claim 1 further comprising the step of providing said quench chamber with a total length from the spinneret to the drawing slot of approximately 1,500 mm or less.

4. The method of claim 1 wherein step (g) includes flowing said fibers at a speed in a range from about 3000 to 7000 meters per minute.

5. The method of claim 1 further comprising exhausting quench fluid from said quench chamber at a location proximate the top of the quench chamber to aid in cooling of filaments and removing gasses and monomers that are a by-product of polymer filament extrusion.

6. The method of claim 1, further comprising the step of rendering said two knife structures movable with respect to one another and capable of being separated substantially to begin the extrusion of fibers without the fibers touching said knife structures.

7. The method of claim 6 wherein the step of rendering includes forming said knife structures as blades having an angle of approximately 45°.

8. The method of claim 6 further comprising the step of slowly moving the separated knife structures toward one another to narrow said slot opening to achieve desired filament production gap settings after spinning is stabilized.

9. The method of claim 6 further comprising the step of slowly moving the separated knife structures toward and away from one another during fiber spinning to change the volumetric flow rate of quench fluid that is released to atmosphere, thereby resulting in different spinning and formation parameters.

10. The method of claim 6 wherein step (g) includes providing said exit nozzle such that the nozzle length in the direction of flow is shorter that the spacing between knife edges of said knife structures.

11. The method of claim 1 further comprising the step of selectively regulating the pressure and volume of the quench fluid to facilitate starting and stopping of a filament spinning operation, to optimize fiber spinning parameters during a fiber spinning operation and/or to facilitate transitions from starting and spinning operations.

12. The method of claim 1 further comprising selectively regulating the pressure, volume and/or temperature of said compressed quench fluid.

13. The method of claim 1 wherein step (a) includes extruding at least some of said filaments as continuous bicomponent polymeric filaments comprising two thermoplastic polymers.

14. The method of claim 1 wherein step (g) includes flowing the turbulent mix of fibers and quench fluid through the drawing slot to attenuate the filaments to a degree of molecular orientation useful to produce fine continuous filaments.

15. A method for forming a spun bond nonwoven web from extruded polymer filaments in a machine having a machine width, comprising of the steps of:

(a) extruding a plurality of continuous thermoplastic polymeric filaments through a spinneret;

(b) non-eductively drawing and cooling a curtain of said filaments in a pressurized quench chamber having an ingress opening at the top of the machine extending substantially across the machine width, said curtain of filaments having a substantially constant filament distribution across the machine width, said step of non-eductively drawing and cooling including dimensioning and configuring the quench chamber to avoid substantial contact between said filaments and interior surfaces of the quench chamber, and providing a quench chamber volume sufficient to allow solidification of said filaments within said quench chamber;

(c) supplying the pressurized quench chamber with compressed quench fluid at a temperature lower than the temperature of the filaments in the quench chamber and at a pressure in a range from about 0.1 to 4 bar;

(d) introducing said quench fluid on at least one side of said curtain of filaments and directing said fluid into contact with said curtain of filaments in said quench chamber to cause cooling of the filaments;

(e) creating a turbulent mix of fibers and quench fluid in an impingement zone located at the bottom of said quench chamber with sufficient turbulence to produce efficient energy transfer from quench fluid velocity to fiber velocity;

(f) increasing the turbulence of said mix in said impingement zone by providing flat lower surfaces of the chamber tapering toward each other in the direction of filament flow through the chamber and terminating at facing edges of respective knife structures; and (g) flowing the turbulent mix of fibers and quench fluid as a stream to a lower pressure environment through a drawing slot in the form of a chamber exit nozzle defined by and between said knife edges and extending substantially across the machine width at the bottom of said chamber and at the impingement zone such that the drawing slot has no substantial nozzle length in the direction of flow through the nozzle to thereby minimize collection of dirt and polymer and monomer in the exit nozzle, whereby, within the first few inches after passing through the drawing slot the turbulent mix stream is rapidly slowed as velocity energy of the quench fluid is transferred to the fibers and the stream entrains air from the lower pressure environment and expands.

16. The method of claim 15 wherein increasing the turbulence of said mix in step (f) includes providing said lower surfaces such that each knife structure is defined between two surfaces having an angle between them in the range from about 15° degrees to 80°.

17. The method of claim 15 further comprising the step of providing said quench chamber with a total length from the spinneret to the drawing slot of approximately 1,500 mm or less.

18. The method of claim 17 further comprising the step of collecting the slowed filaments for formation into a nonwoven fabric sheet on a web forming conveyor.

19. The method of claim 15 further comprising the step of rendering the knife structures transversely movable with respect to one another and capable of being separated substantially to begin the extrusion of fibers without the fibers touching said knife structures.

20. The method of claim 19 further comprising the step of slowly moving the separated knife structures toward one another to transversely narrow said slot to achieve desired filament production gap settings after spinning is stabilized.

21. The method of claim 20 further comprising the step of slowly moving the separated knife structures toward and away from one another during fiber spinning to change volume of quench fluid that is released to atmosphere, thereby resulting in different spinning and formation parameters.

22. The method of claim 15 further comprising selectively regulating the pressure, volume and/or temperature of said compressed quench fluid.

23. The method of claim 15 wherein step (a) includes extruding at least some of said filaments as continuous bicomponent polymeric filaments comprising two thermoplastic polymers.

24. The method of claim 15 wherein step (d) further includes:
    avoiding substantial contact between said filaments and interior surfaces of the quench chamber; and
    allowing solidification of said filaments within the quench chamber.

25. The method of claim 15 wherein step (d) includes the step of introducing the quench fluid in the quench chamber on at least one side of said filaments at a temperature lower than the temperature of the filaments.

26. The method of claim 25 wherein the creation of the turbulent mix of fibers and quench fluid in step (e) includes transferring energy from the quench fluid pressure to quench fluid velocity and then from quench fluid velocity to fiber velocity.

* * * * *